UNITED STATES PATENT OFFICE.

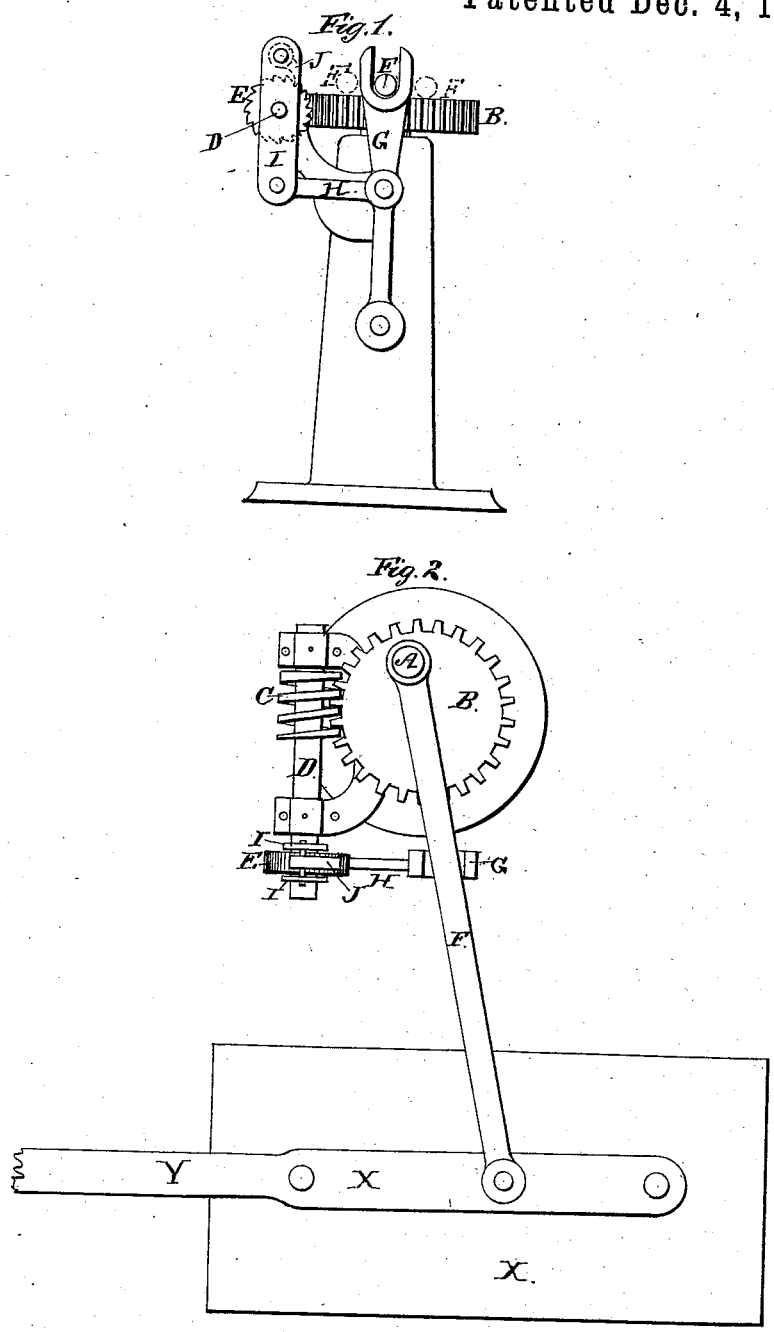

CHARLES BARBOUR, OF TARENTUM, PENNSYLVANIA.

GLASS-SMOOTHING MACHINE.

SPECIFICATION forming part of Letters Patent No. 289,747, dated December 4, 1883.

Application filed September 1, 1883. (No model.)

*To all whom it may concern:*

Be it known that I, CHARLES BARBOUR, a subject of the Queen of Great Britain, residing at Tarentum, in the county of Allegheny and State of Pennsylvania, have invented certain new and useful Improvements in Glass-Smoothing Machines, of which the following is a specification, reference being had therein to the accompanying drawings.

Figure 1 represents a front elevation of my improvements in machines for smoothing plate-glass. Fig. 2 is a top plan view which illustrates my invention.

In the art the usual way of smoothing plate-glass is to provide a stationary table, upon which a plate of glass is fixed flatwise. The upper surface of this plate is sprinkled with emery-dust and water. A second plate is then placed on top of the first plate of glass, and over the second or top plate are arranged wet cloths or sheets of rubber. A wood frame, X, rests upon the wet cloths. Motion is imparted to this frame through a connecting-rod driven by a crank, and the adhesive properties of the cloths or rubber cause the top plate of glass to move along with the frame. In this way the two contacting sheets of glass abrade each other by means of the abrasive qualities of the emery.

The object of my present invention is to remove from the surface of the glass all scratches or roughness which the glass has received during its going through a previous process of sand-grinding, the effect of which is to give the plate-glass a perfectly even surface, and to prepare the glass for the subsequent action of the polishing-machine.

To enable the glass to be smoothed more effectively than has hitherto been done, I have devised my improvement, the construction of which will be first generally stated, and then particularly described farther on.

Heretofore, in the construction of smoothing-machines, to enable the plate-glass to maintain its proper position during the abrasion process, a guide or "radius" rod is attached to the connecting-rod Y, which actuates the frame X. One end of this radius-rod commonly works on a stationary pin or center, by which a curvilinear motion was given to the top glass and frame, the line or the motion always being exactly in the same path, and thereby causing the surface of the glass to become ridged and uneven; hence the desired object of the smoothing-machine is not properly attained. As stated, the object of my improvement is to remove this difficulty.

My invention consists in the following construction and arrangement of the parts, and which will be first fully described, and then pointed out in the claims.

Referring to the drawings, instead of the pin A being stationary, as is usual, it is affixed eccentrically in a worm or gear wheel, B. This wheel receives motion from a worm, C, placed on a small spindle, D, or shaft, to which motion is imparted by ratchet-wheel E. The ratchet-wheel derives its motion as follows: Upon reciprocating movement being given the connecting-rod Y, (by means of a crank-arm from any motive power,) the end of the radius-rod F, which is attached to the rod Y, is correspondingly vibrated.

G is a lever pivoted at its lower end, and which is oscillated by the vibration of the radius-rod F. Midway of the pendulum G is a connecting-rod, H.

I I is a lever arrangement, having its pivotal point or fulcrum on the spindle D, its lower arm united to the connecting-rod H, and its upper end carrying a gravity-pawl, J, which engages with the ratchet-wheel E. The radius-rod is attached to the pin A in such manner that the radius-rod and frame X, with its connections, may be lifted sufficiently to inspect the progress of the work, the lever G being provided with a bifurcated open jaw, which allows the radius-rod to be raised out of the said jaw. As motion is given to the worm C and pinion B at each stroke of the connecting-rod Y, (by means of lever G, lever I, pawl J, and ratchet E,) it follows that the position of the pin A of the radius-rod F is changed at every stroke of the rod Y, and which causes the top glass plate to receive side as well as end motion. This movement removes all tendency of "ridging," and gives to the glass a perfectly even surface, and which allows of the radius-rod being lifted or raised when an inspection of the operation of smoothing glass is made.

I claim—

1. In a machine for smoothing glass, the radius-rod F, the oscillating lever G, pivoted at its lower end, the worm-wheel B, having the pin A, and which meshes with the worm C, the worm-shaft carrying the ratchet E, the rock-lever device I, carrying pawl J, and the rod H, connecting the said reciprocating lever G with the rock-lever I, the whole constructed to act in combination, so that the motion given the radius-rod by the connecting-rod Y shall operate the device, substantially as described.

2. In a machine for smoothing glass, the combination of the radius-rod F, having a changing center, with the oscillating lever G, having an open jaw, in which the radius-rod works, and which allows of the latter being raised out of the jaw to allow examination of the glass plates during the smoothing process.

In testimony whereof I affix my signature in presence of two witnesses.

CHARLES BARBOUR.

Witnesses:
CHAS. W. STEVENER,
F. R. FRAZE.